US012798264B2

(12) United States Patent
Yasuda et al.

(10) Patent No.: US 12,798,264 B2
(45) Date of Patent: Nov. 17, 2026

(54) CONTROL APPARATUS, PRINTING APPARATUS, CONTROL METHOD, AND STORAGE MEDIUM

(71) Applicant: CANON KABUSHIKI KAISHA, Tokyo (JP)

(72) Inventors: Ayumi Yasuda, Kanagawa (JP); Keiji Kuriyama, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 110 days.

(21) Appl. No.: 18/958,380

(22) Filed: Nov. 25, 2024

(65) Prior Publication Data

US 2025/0187351 A1 Jun. 12, 2025

(30) Foreign Application Priority Data

Dec. 12, 2023 (JP) ................................ 2023-209241

(51) Int. Cl.
*B41J 11/00* (2006.01)
*B41J 2/21* (2006.01)
*H04N 1/60* (2006.01)

(52) U.S. Cl.
CPC ............. *B41J 11/0022* (2021.01); *B41J 2/21* (2013.01); *H04N 1/605* (2013.01)

(58) Field of Classification Search
CPC .............. B41J 29/393; B41J 2029/3935; B41J 2203/01; B41J 11/002
See application file for complete search history.

(56) References Cited

U.S. PATENT DOCUMENTS

| | | | | |
|---|---|---|---|---|
| 11,840,079 | B2 | 12/2023 | Kuriyama | |
| 11,840,101 | B2 | 12/2023 | Ushiyama | |
| 11,999,177 | B2 | 6/2024 | Kanda | |
| 2011/0075171 | A1 | 3/2011 | Hoshii | |
| 2016/0052300 | A1* | 2/2016 | Ueshima | B41J 2/21 347/16 |
| 2017/0165980 | A1* | 6/2017 | Kanada | B41J 11/0022 |
| 2024/0198676 | A1 | 6/2024 | Nishioka | |
| 2024/0202478 | A1 | 6/2024 | Kuriyama | |

FOREIGN PATENT DOCUMENTS

JP 2011-077844 A 4/2011

OTHER PUBLICATIONS

Paper and Board—Determination of the Liquid Absorbability—Bristow's Method.
Paper and Board—Determination of the Liquid Absorbability—Bristow's Method, Japan Tappi Paper Pulp Test Method No. 51, Japan Tappi Paper and Pulp Test Methods, 2000, pp. 51/1-51/6.

* cited by examiner

*Primary Examiner* — Julian D Huffman
(74) *Attorney, Agent, or Firm* — Venable LLP

(57) ABSTRACT

Provided is a control apparatus configured to control a printing apparatus including a conveyance unit configured to convey a printing medium along a first direction, a printing unit configured to eject a liquid onto the conveyed printing medium, and multiple drying units arranged in a second direction crossing the first direction and configured to dry the liquid ejected on the printing medium, the control apparatus including: a setting unit configured to set a region on the printing medium based on information of a position in which each of the multiple drying units is arranged; and a control unit configured to cause the printing unit to print an adjustment pattern for calibration in the region set on the printing medium.

16 Claims, 13 Drawing Sheets

CONTROL APPARATUS, PRINTING APPARATUS, CONTROL METHOD, AND STORAGE MEDIUM

BACKGROUND

Field

The present disclosure relates to a technique of printing an image on a printing medium.

Description of the Related Art

There has been known calibration as a method of correcting a color printed by a printing head of an ink jet printing apparatus.

Japanese Patent Laid-Open No. 2011-077844 (PTL 1) describes a method of executing calibration. In PTL 1, information of a color printed by a printing head is obtained by measuring multiple patches printed on a printing medium, and a parameter for color correction is generated based on the obtained information of the color. Then, in PTL 1, the calibration is executed by correcting image data by using the parameter for color correction.

Incidentally, as a printing apparatus that prints an image on a non-absorbent or low-absorbent printing medium, there is an ink jet printing apparatus including a drying device. It is possible to form an image on the printing medium by drying an ink applied on the non-absorbent or low-absorbent printing medium by the drying device.

In some cases, the drying device mounted on the ink jet printing apparatus is formed of multiple drying units arranged in a direction crossing a conveyance direction of the printing medium. In such a drying device, the drying performances of the multiple drying units may vary from one another. In a case where the drying performances of the multiple drying units vary from one another, in some cases, uneven density occurs in the image formed on the printing medium. Therefore, in a case where the ink jet printing apparatus including the multiple drying units prints the multiple patches on the printing medium to perform the calibration as described in PTL 1, in some cases, planes of the patches vary due to the uneven density. In this case, there is a possibility of reduction in the accuracy of the calibration.

SUMMARY

A control apparatus of the present disclosure is a control apparatus configured to control a printing apparatus including a conveyance unit configured to convey a printing medium along a first direction, a printing unit configured to eject a liquid onto the conveyed printing medium, and multiple drying units arranged in a second direction crossing the first direction and configured to dry the liquid ejected on the printing medium, the control apparatus including: a setting unit configured to set a region on the printing medium based on information of a position in which each of the multiple drying units is arranged; and a control unit configured to cause the printing unit to print an adjustment pattern for calibration in the region set on the printing medium.

Further features of the present disclosure will become apparent from the following description of exemplary embodiments with reference to the attached drawings.

DESCRIPTION OF THE EMBODIMENTS

Embodiments of a technique of the present disclosure are described below with reference to the drawings.

First Embodiment

[Configuration of Ink Jet Printing Apparatus]

Figure 1:
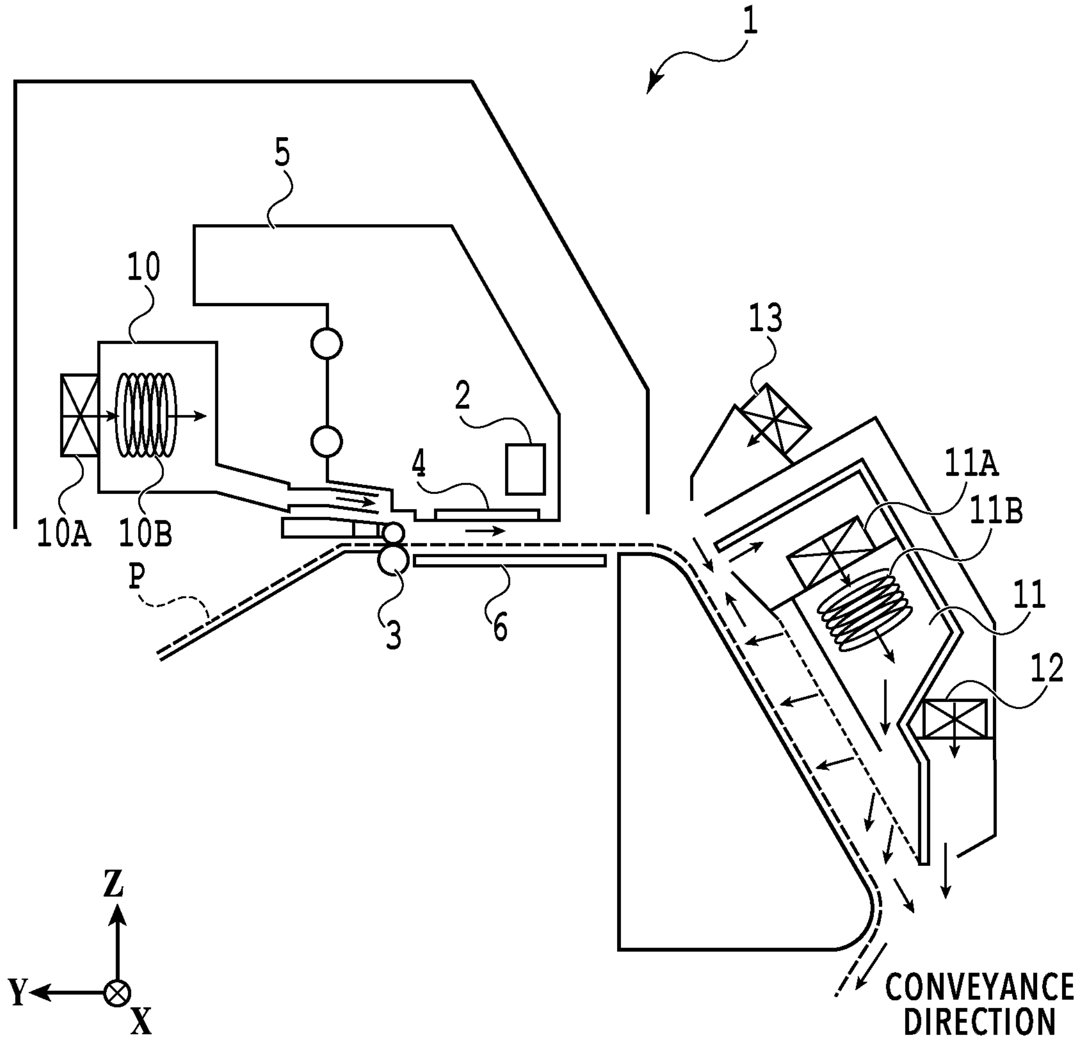
FIG. 1 is a side view illustrating a schematic configuration of an ink jet printing apparatus.

FIG. 1 is a side view schematically illustrating a schematic configuration of an ink jet printing apparatus according to the present embodiment. An ink jet printing apparatus (hereinafter, also referred to as a "printing apparatus", simply) 1 conveys a printing medium P by a conveyance mechanism including a conveyance roller pair 3 of a conveyance roller and a pinch roller. In addition, printing of an image and the like on the printing medium P is performed with a printing head 4 scanning the conveyed printing medium P in an X direction illustrated in FIG. 1 and the printing head 4 ejecting an ink and the like while the scanning.

It is described in the present embodiment that the printing medium P has the form of so-called roll-to-roll, in which the printing medium P is fed from a wound state and is wound again after printing; however, it is not limited to this form. The printing medium P may be cut paper, for example. The printing head 4 can perform the scanning on the printing medium P by being mounted on a carriage 5, which is formed to be able to move along the X direction. The printing head 4 includes an ejection port for each type of ink to perform ejection according to printing data from the corresponding ejection port and applies the ink to the printing medium P. Details of the printing head 4 are described later.

An optical sensor 2 is attached to the carriage 5. With use of the optical sensor 2, reflection optical density of an adjustment pattern 600 (see FIG. 6) formed by applying the ink to the printing medium P is obtained. Details of a configuration of the optical sensor 2 are described later.

A platen 6 is provided in a position facing a scanning region of the printing head 4 and supports the printing medium P from a back surface side thereof. Additionally, the platen 6 includes a suction port to allow for sucking of the printing medium P by a suction mechanism (not illustrated)

with force of an amount to the extent without disturbing the conveyance of the printing medium P. Note that, the printing head 4 may have a configuration to be detachably mounted on the carriage 5.

In the printing apparatus 1, a platen air-blowing device 10 and a fixation device 11 are disposed as a configuration to dry the ink ejected on the printing medium P. The platen air-blowing device 10 is formed of four drying units arranged along the X direction illustrated in FIG. 1. The multiple drying units forming the platen air-blowing device 10 are called air-blowing units 10-1 to 10-4. The fixation device 11 is formed of six drying units arranged along the X direction illustrated in FIG. 1. The multiple drying units forming the fixation device 11 are called fixation units 11-1 to 11-6.

The platen air-blowing device 10 is provided upstream of the printing head 4 in a conveyance direction of the printing medium P. Each of the air-blowing units 10-1 to 10-4 forming the platen air-blowing device 10 includes a fan 10A and a heater 10B. The air-blowing units 10-1 to 10-4 blow warm air at a predetermined temperature from a corresponding air outlet onto a region of the printing medium P to which the ink ejected from the printing head 4 is applied. Thus, it is possible to dry the ink applied to the printing medium P.

The fixation device 11 is provided downstream of the printing head 4 in the conveyance direction of the printing medium P. The fixation device 11 is provided to dry the ink applied to the printing medium P after printing and fix the ink to the printing medium. Each of the fixation units 11-1 to 11-6 forming the fixation device 11 includes a housing substantially in the form of a box. An opened bottom surface portion of the housing is the air outlet of warm air, and the air outlet faces a surface of the conveyed printing medium P. Each housing of the fixation units 11-1 to 11-6 includes a fan 11A and a heater 11B therein. With the configuration, each of the fixation units 11-1 to 11-6 can blow the warm air from the air outlet to the printing medium P, evaporate water and solvent included in the ink and the like applied to the printing medium P, and fix the applied ink and the like to the printing medium.

A downflow unit 12 includes a fan and blows the warm air emitted from the fixation device 11 to a lower side of the apparatus. An air curtain unit 13 is provided between the platen 6 and the fixation device 11 and prevents mist of the ink and the like flowing due to the air-blowing by the platen air-blowing device 10 from entering the inside of each unit of the fixation device 11.

[About Optical Sensor]

Figure 2A:
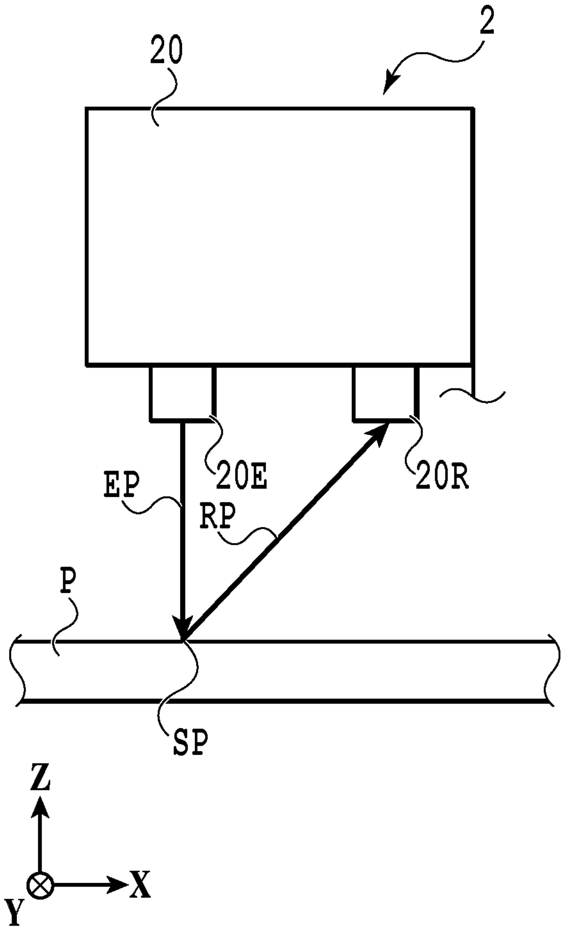
FIGS. 2A and 2B are diagrams illustrating a schematic configuration of an optical sensor.
Figure 2B:
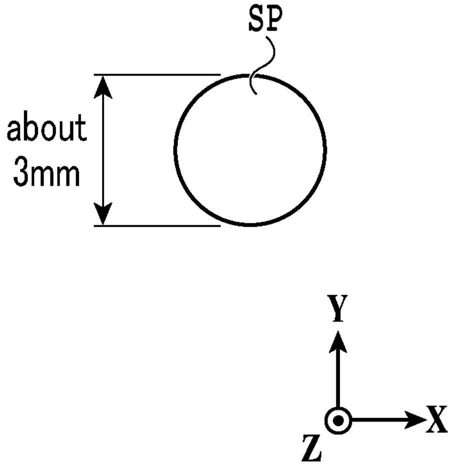

FIGS. 2A and 2B are diagrams illustrating a schematic configuration of the optical sensor 2 illustrated in FIG. 1. As illustrated in FIG. 2A, the optical sensor 2 includes a main body 20, a light emitter 20E, and a light receiver 20R. The main body 20 is disposed and fixed on the carriage 5 such that a detection spot SP is positioned downstream of an ejection port array of the printing head 4 in a Y direction.

The light emitter 20E is formed of an LED of R, G, B, or the like, for example. The light receiver 20R is formed of a photodiode, for example. The light emitter 20E and the light receiver 20R are provided on a lower surface side of the main body 20. The light emitter 20E emits light EP to the printing medium P, and the light diffuses reflection on the printing medium P. The light receiver 20R receives reflected light RP reflected from the printing medium P. FIG. 2B illustrates the detection spot by the emission of the light EP. A diameter of the detection spot SP is about 3 mm in diameter, for example. A detection signal (an analog signal) of the reflected light RP received by the light receiver 20R is transmitted to a control circuit (not illustrated) of the printing apparatus 1 via a flexible cable (not illustrated) and the like. The control circuit converts the detection signal of the inputted reflected light RP into a digital signal by an A/D converter.

[Configuration of Printing Head]

Figure 3:
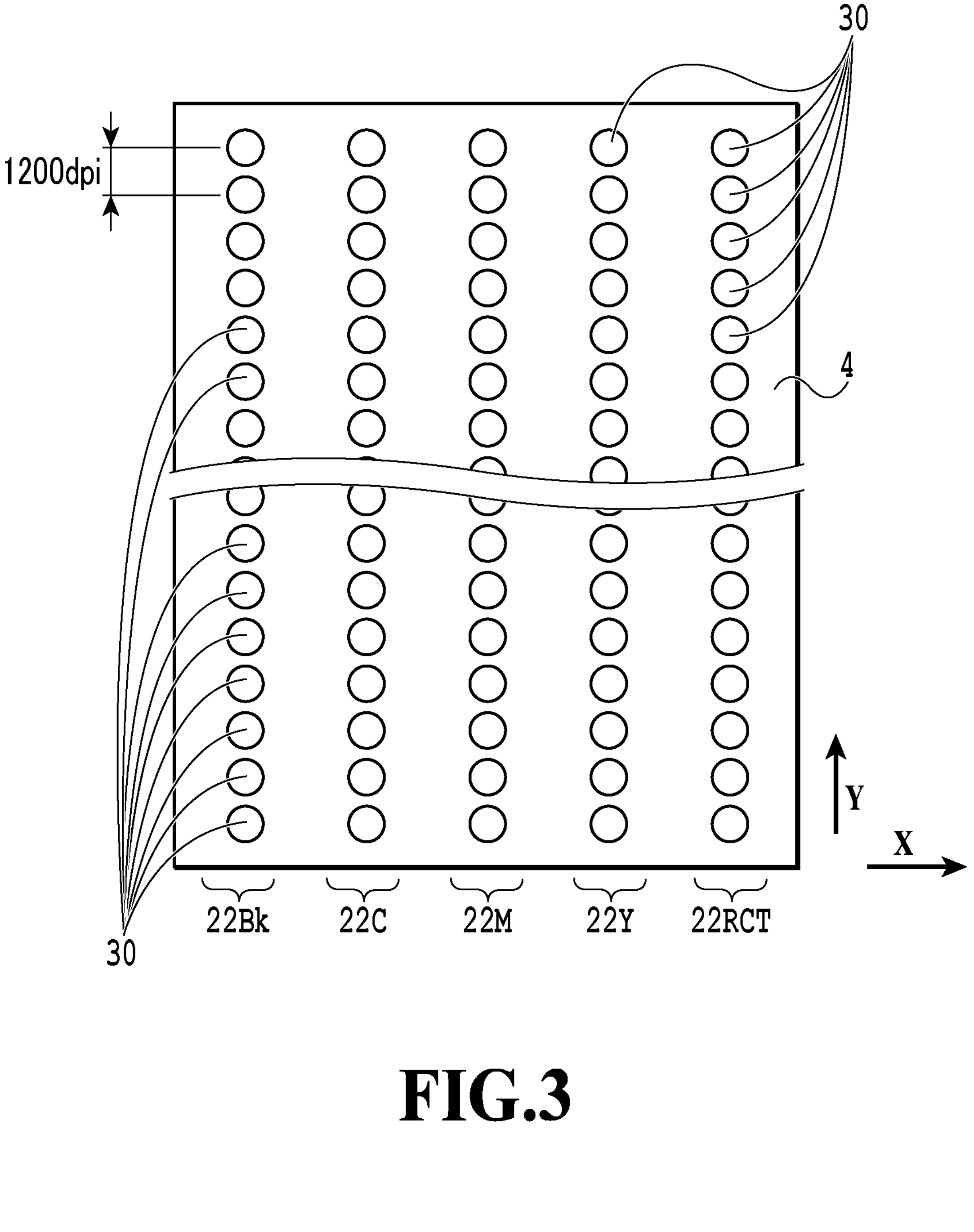
FIG. 3 is a diagram illustrating an ejection port surface of a printing head.

FIG. 3 is a diagram schematically illustrating an ejection port surface of the printing head 4 according to the present embodiment. The printing head 4 includes five ejection port arrays that eject different types of liquids. The ejection port arrays of the printing head 4 include four ejection port arrays that eject inks (hereinafter, referred to as color inks) containing color materials. Specifically, the printing head 4 includes an ejection port array 22Bk that ejects a black ink (Bk), an ejection port array 22C that ejects a cyan ink (C), an ejection port array 22M that ejects a magenta ink (M), and an ejection port array 22Y that ejects a yellow ink (Y). In addition, the printing head 4 includes an ejection port array 22RCT that ejects a reactant (RCT) containing no color material. The reactant contains a component that reacts with the color material contained in the color ink and causes aggregation of the color material by contact between the reactant and the color ink on the printing medium P. Therefore, the reactant can suppress blurring of the color ink and improve the density. Note that, in the present specification, making reference to the "ink" includes the reactant in some cases.

In the printing head 4, the ejection port arrays 22Bk, 22C, 22M, 22Y, and 22RCT are arranged next to each other from the left side in the X direction, sequentially. In each of the ejection port arrays 22Bk, 22C, 22M, 22Y, and 22RCT, 1280 ejection ports 30 that eject the ink are arranged in a Y direction (an array direction) at a density of 1200 dPi.

In the present embodiment, an amount of the ink ejected from single ejection from each ejection port 30 is about 4.5 pl. An ink channel corresponding to each of the ejection port arrays 22Bk, 22C, 22M, 22Y, and 22RCT is connected to a not-illustrated ink tank retaining the corresponding ink, and each ink is supplied from the ink tank to each ejection port array. The printing head 4 and the not-illustrated ink tank may be formed integrally or may be formed to be separable from each other. Note that, in a case of mentioning any one of the five ejection port arrays 22Bk, 22C, 22M, 22Y, and 22RCT, it may be described as an ejection port array 22.

In the printing head 4, an energy generation element (hereinafter, also referred to as a printing element) to generate ejection energy to eject the ink from the ejection port 30 is arranged. In the present embodiment, an electrothermal converter that causes film boiling by heating the ink locally and uses a pressure therefrom to eject the ink is used as the energy generation element; however, the energy generation element is not limited to the electrothermal converter. In addition, for example, it is also possible to use an electric machinery conversion element as the energy generation element.

[Configuration of Printing System]

Figure 4:
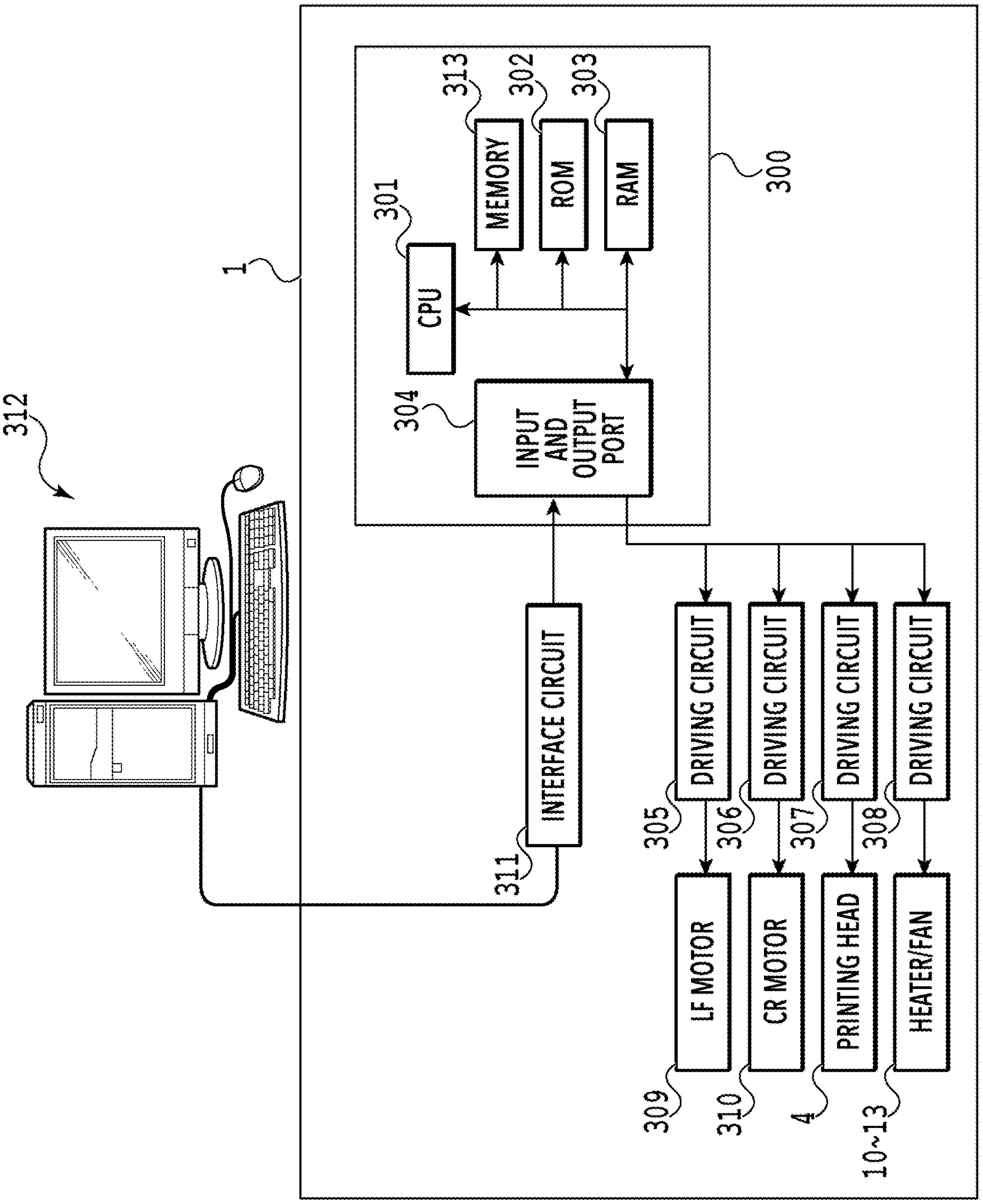
FIG. 4 is a block diagram illustrating a control configuration of the ink jet printing apparatus.

FIG. 4 is a block diagram describing a configuration of a control unit 300 of the printing apparatus 1. The control unit 300 includes a CPU 301, a ROM 302, a RAM 303, a memory 313, and an input and output port 304. The control unit 300 is connected to a host apparatus (PC) 312 via an interface circuit 311.

The CPU 301 executes a processing operation such as computation, determination, and control and a printing operation. The ROM 302 stores a control program and the like executed by the CPU 301, and the RAM 303 is used as a buffer and the like of the printing data. The input and output port 304 is connected to various driving circuits 305 to 308. The driving circuit 305 drives a conveyance motor (an LF motor) 309 as a driving source to convey the printing medium P. The driving circuit 306 drives a carriage motor (an CR motor) 310 to allow the carriage 5 to perform scanning. The driving circuit 307 causes the printing head 4 to eject the ink. The driving circuit 308 drives the platen air-blowing device 10, the fixation device 11, the downflow unit 12, and the air curtain unit 13 individually.

[Multipass Printing]

The printing apparatus 1 of the present embodiment performs multipass printing in which the printing head 4 performs printing and scanning corresponding to a unit region of the printing medium P and conveyance of the printing medium P by a conveyance amount corresponding to the unit region multiple times and thus printing on the unit region is completed.

Figure 5:
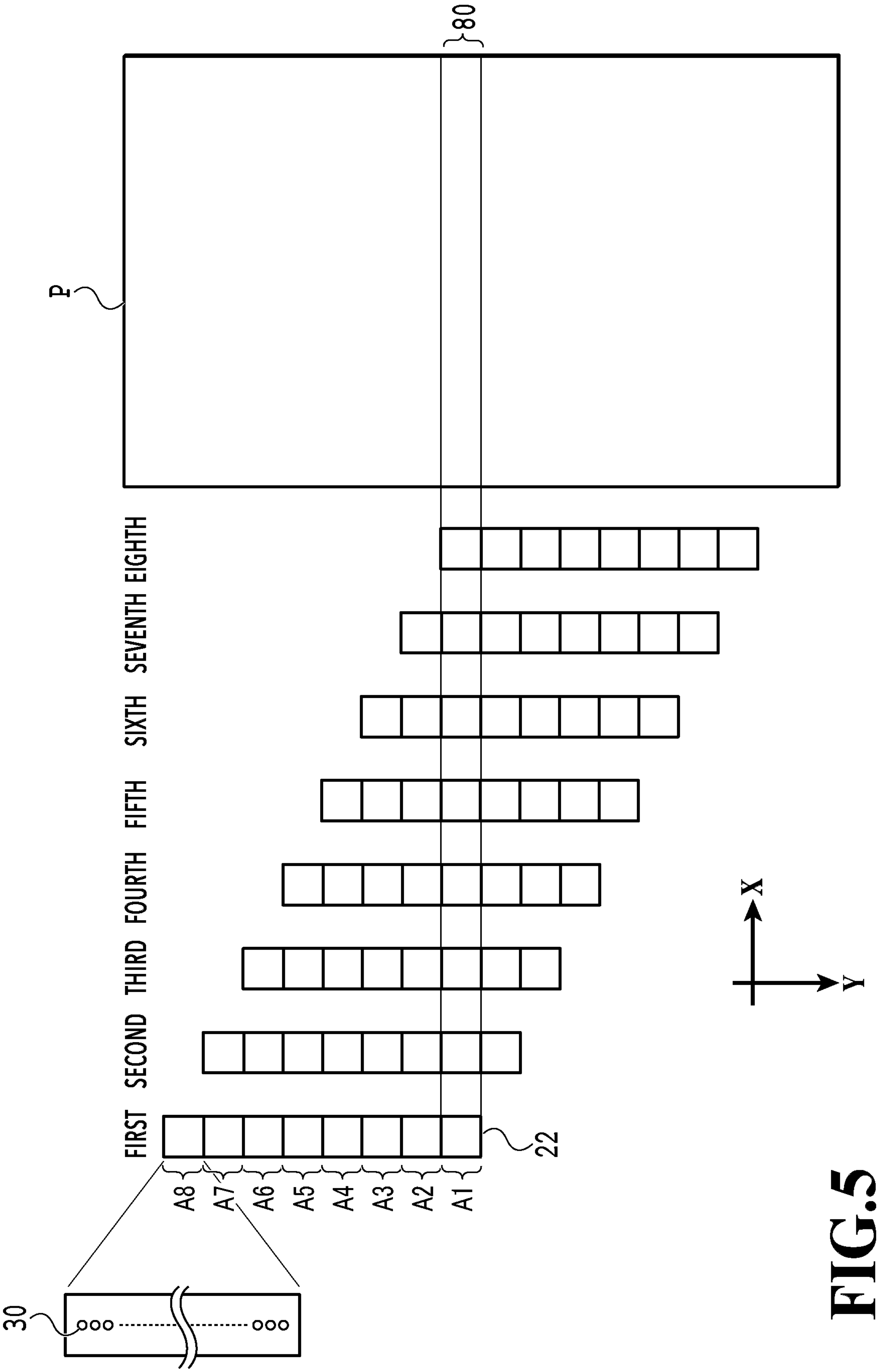
FIG. 5 is a diagram describing multipass printing.

FIG. 5 is a diagram describing the multipass printing. FIG. 5 is a diagram describing eight-pass printing in which the printing head 4 performs printing by eight times of scanning on a unit region 80 and completes an image in the unit region 80 of the printing medium P. The ejection port array 22 is sectioned into eight ejection port groups A1 to A8 corresponding to the unit region 80, and each ejection port group includes continuous 48 ejection ports 30. In FIG. 5, one array of the ejection port array 22 is picked up and described; however, a similar operation as the following description is performed also with the other ejection port arrays. As illustrated in FIG. 1, the printing medium P is conveyed in a −Y direction in reality; however, for the sake of convenience, FIG. 5 illustrates that the ejection port array 22 is moved in the +Y direction to show that the printing medium P is conveyed in the −Y direction.

In the first time in FIG. 5, first pass of printing is performed in which the printing head 4 causes the ejection port 30 of the ejection port group A1 to eject the ink to the unit region 80 according to the printing data corresponding to the first scanning while the scanning in the X direction is performed by the carriage 5. After the first pass of printing, the printing medium P is conveyed by a distance corresponding to one ejection port group in the −Y direction, that is, by an amount corresponding to the unit region 80 in the conveyance direction, and accordingly the ejection port group A2 of the ejection port array 22 faces the unit region 80. In the second time in FIG. 5, second pass of printing is performed in which the printing head 4 causes the ejection port 30 of the ejection port group A2 to eject the ink to the unit region 80 according to the printing data corresponding to the second scanning while scanning in the X direction. Thereafter, similarly, the conveyance of the printing medium P and the scanning of the printing head 4 are performed alternately to execute the third to eighth passes of printing in which the ink is ejected from the ejection ports of the ejection port groups A3 to A8 to the unit region 80. Once the first to eighth passes of printing on the unit region 80 are completed, the image formed in the unit region 80 is completed.

[Color Ink and Reactant]

The color inks (C, M, Y, and Bk) and the reactant (RCT) in the present embodiment all contain a water-soluble organic solvent. A boiling point of the water-soluble organic solvent is preferably 150° C. or higher and 300° C. or lower for the humidity and the moisture retention of a face surface of the printing head 4. A ketonic compound such as acetone and cyclohexanone, a propylene glycol derivative such as tetraethylene glycol dimethyl ether, a heterocyclic compound having a lactam structure including N-methylpyrrolidone and 2-pyrrolidone, and the like are particularly preferable. In terms of the ejection performance, a contained amount of the water-soluble organic solvent is preferably 3 wT % or greater and 30 wT % or smaller. For example, the water-soluble organic solvent is: alkyl alcohols with the carbon number of one to four such as methyl alcohol, ethyl alcohol, n-propyl alcohol, isopropyl alcohol, n-butyl alcohol, SeC-butyl alcohol, and TeRT-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; or ethylene glycol. Alternatively, alkylene glycols with alkylene groups including two to six carbon atoms such as propylene glycol, butylene glycol, triethylene glycol, 1,2,6-hexanetriol, thiodiglycol, hexylene glycol, and diethylene glycol; lower alkyl ether acetate such as polyethylene glycol and monomethyl ether acetate; glycerin; lower alkyl ethers of polyhydric alcohol such as ethylene glycol monomethyl (or ethyl) ether, diethylene glycol methyl (or ethyl) ether, triethylene glycol monomethyl (or ethyl) ether; polyhydric alcohol such as trimethylol propane and trimethylol ethane; N-methyl-2-pyrrolidone, 2-pyrrolidone, 1,3-dimethyl-2-imidazolidinone, or the like is applied. The water-soluble organic solvent can be used either independently or as a mixture. Additionally, deionized water is desirably used as water. A contained amount of the water-soluble organic solvent in the reactant (RCT) is not particularly limited. It is possible to add surfactant, a defoaming agent, preservative, and an antifungal agent in addition to the above-described components to the color inks (C, M, Y, and Bk) appropriately to provide a desired physical property value as needed.

Additionally, the color inks (C, M, Y, and Bk) and the reactant (RCT) used in the present embodiment all contain the surfactant. The surfactant is used as penetrant for improving the permeability of the ink on a printing medium dedicated for ink jet. The greater the amount of the surfactant added, the stronger the property of reducing the surface tension of the ink, and the more improved the wettability and the permeability of the ink on the printing medium. In the present embodiment, as the surfactant, a small amount of an acetylene glycol EO adduct and the like are added, and thus the surface tension of each ink is adjusted to be 30 dYn/CM or smaller, and additionally a difference in the surface tensions between the inks is adjusted to be within 2 dYn/CM. To be more specific, the surface tensions of all the inks are adjusted to be about 28 to 30 dYn/CM. The surface tension is measured by using a fully automatic surface tensiometer CBVP-Z (manufactured by Kyowa Interface Science Co., Ltd.). Note that, as long as it is possible to measure the surface tension of the ink, the measure instrument is not limited to the example.

In terms of preventing dissolution and deterioration of a member that is put in contact with each ink in the printing head 4 of the printing apparatus 1 and reduction in the solubility of dispersed resin in the ink, PH of each ink is preferably 7.0 or greater and 10.0 or smaller. Therefore, PH of each ink in the present embodiment is all stable on the alkali side, and a value thereof is 8.5 to 9.5. PH is measured by using PH METER F-52 manufactured by HORIBA, Ltd. Note that, as long as it is possible to measure PH of the ink, the measure instrument is not limited to the example.

[Printing Medium]

It is described that printing on a low permeability printing medium into which water does not permeate easily is performed in the printing apparatus 1 of the present embodiment. The low permeability printing medium is a printing medium that has completely no water absorbency or has a considerably small absorbed amount. Accordingly, with a water-based ink containing no organic solvent, the ink is repelled, and it is impossible to print an image on the low permeability printing medium. On the other hand, the low permeability printing medium has excellent water resistance and weather resistance and is appropriate for a printing medium to generate a printing product to be used outdoors. Usually, a printing medium with a water contact angle at 25° C. is 45° or greater or preferably 60° or greater is used.

The low permeability printing medium includes a printing medium in which a plastic layer is formed on the uppermost surface of a base material, a printing medium in which no ink reception layer is formed on the base material, a sheet, a film, a banner, or the like that is made of glass, yupo, plastic, or the like. An example of coated plastic includes polyvinyl chloride, polyethylene terephthalate, polycarbonate, polystyrene, polyurethane, polyethylene, polypropylene, and the like. The low permeability printing medium described above has excellent water resistance, light resistance, and scratch resistance; for this reason, in general, the low permeability printing medium is used to generate a printing product for outdoor display.

As an example of a method of evaluating the permeability of the printing medium, it is possible to use the Bristow's method described in "Method for Determining the Liquid Absorbability of Paper and Board" of JAPAN TAPPI standards No. 51. Next, the measurement method of the Bristow method is simply described. First, a predetermined amount of ink is poured into a holding container having an opening slit of a predetermined size, and through the slit, the ink is put in contact with the printing medium that is processed into the form of a strip and wound around a disk. Next, while keeping the position of the holding container, the disk is rotated, and an area (a length) of an ink region that is transferred to the printing medium is measured. Based on the area of this ink region, it is possible to calculate a transfer amount (ml/m$^2$) per second per unit area. In the present embodiment, a printing medium that obtains the transfer amount (a water absorbed amount) of the ink by 30 msec1/2 by the Bristow method that is smaller than 10 ml/m$^2$ is recognized as the low permeability printing medium.

[About Calibration]

In a case where an image is printed on the printing medium by the printing head including the multiple ejection port arrays as the printing head 4 of the present embodiment, a color tone of the image formed on the printing medium may be different from a desired color tone. The reason of the difference between the color tone of the image on the printing medium and the desired color tone is that, in some cases, the ejection characteristics of the inks differ between the individual ejection port arrays, and the difference in the ejection characteristics of the inks between the ejection port arrays changes density values of the image on the printing medium. Likewise, in a case where an image is printed on the printing medium by using multiple printing heads, because the ejection characteristics of the inks of the individual printing heads are different, the color tone of the image formed on the printing medium is different from the desired color tone in some cases. As a technique of correcting the difference in the color tone due to the different ejection characteristics of the inks between the ejection port arrays or between the printing heads, there is uneven color correction processing (calibration). The calibration is processing to allow for reproduction of an expected reference color on the printing medium. With the calibration, it is possible to suppress a variation of the color formed on the printing medium by the printing head.

Figure 6:
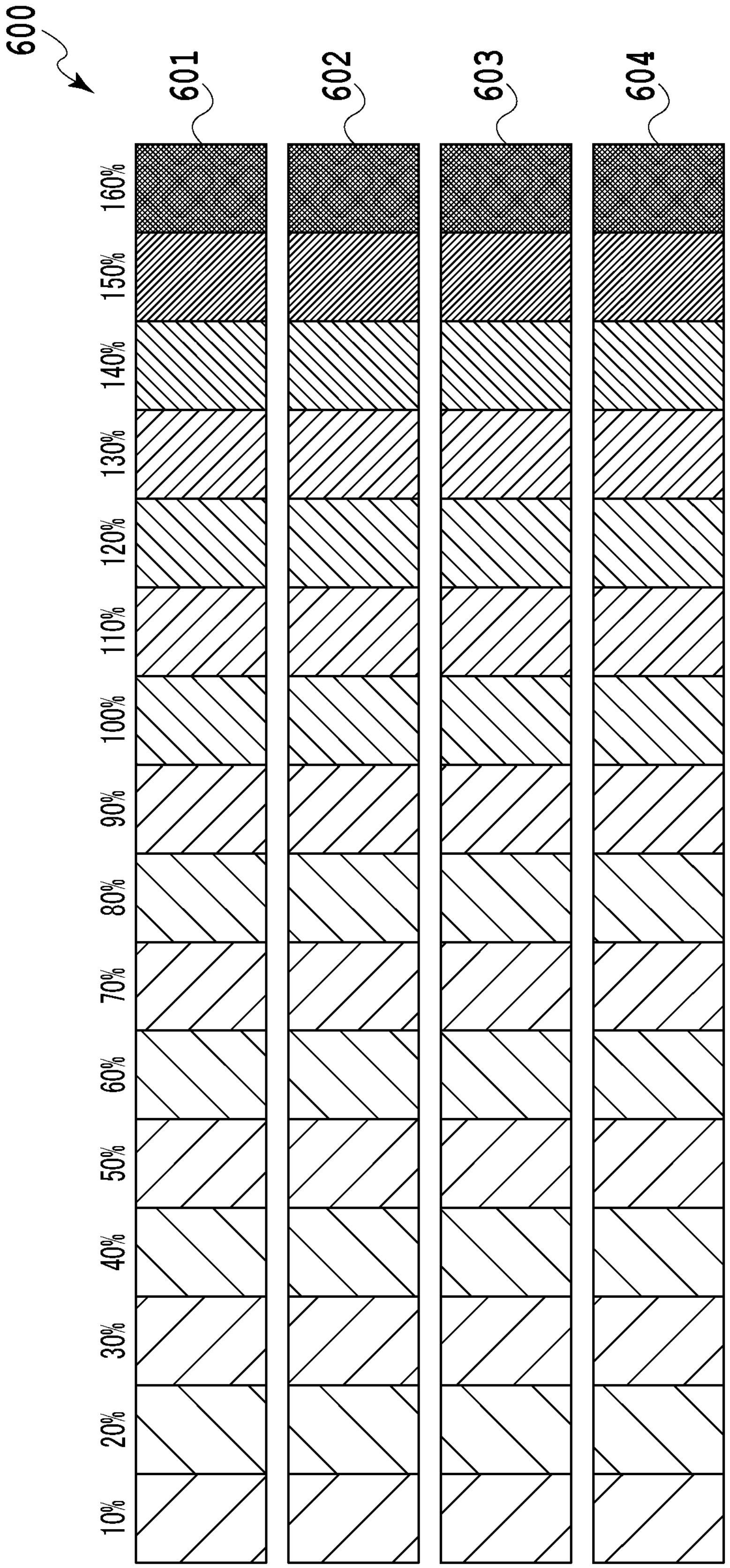
FIG. 6 is a schematic view describing an adjustment pattern.

FIG. 6 is a diagram illustrating an example of an adjustment pattern 600 for the calibration. The adjustment pattern 600 includes patch groups of the four colors, which are a Bk ink patch group 601, a C ink patch group 602, an M ink patch group 603, and a Y ink patch group 604. Each ink patch group is formed of patches of 16 scales of printing duties of 10% to 160%. That is, there are patches of the printing duties with scale values of 10%, 20%, 30%, 40%, 50%, 60%, 70%, 80%, 90%, 100%, 110%, 120%, 130%, 140%, 150%, and 160%.

In order to execute the calibration, first, the printing head 4 is caused to print the adjustment pattern 600 on the printing medium P based on image data of the adjustment pattern 600. Then, the density value of each patch of the adjustment pattern 600 on the printing product obtained as a result of the printing is measured, and thus information related to the color printed by the ejection port array of each ink. Since the adjustment pattern 600 includes the patches of the 16 scales, information of a difference between the actual density value and the desired density value in a case where the printing is performed based on the image data of each of the 16 scales is obtained. Then, a parameter for color correction is generated based on the obtained information such that the printing head 4 can reproduce the expected reference color. With the correction of the received image data by using this parameter for color correction, it is possible to print the image indicated by the received image data with the desired color tone.

Thus, with the ejection port array 22 printing the adjustment pattern 600 based on the image data of the adjustment pattern 600, it is possible to obtain the information of the difference between the actual density value and the desired density value of each of the 16 scales, and it is possible to determine a proper parameter for color correction. Therefore, in order to obtain the information to properly determine the parameter for color correction, it is preferable to form the adjustment pattern 600 on the printing medium while preventing the density of the patch formed on the printing medium P from changing due to a cause other than the ejection characteristics of the ejection port array 22.

[About Uneven Density Caused by Drying Device]

In a case where the printing apparatus in which multiple drying units including a fan and a heater are arranged in a width direction crossing the conveyance direction of the printing medium P performs drying of the ink applied on the printing medium P, uneven density occurs in some cases. A cause of this occurrence of the uneven density is described. The cause of the occurrence of the uneven density is different depending on the printing duty.

FIGS. 7A to 7E are diagrams describing the cause of the uneven density that occurs in a case where an image with the printing duty of less than 100%, which is formed on the low permeability printing medium, is dried with air-blow. Note that, in the following descriptions, printing one dot at 1200 dpi is the printing duty of 100%.

The "air-blow drying" indicates drying of the ink in the middle of image formation immediately after the ejection onto the printing medium. In the present embodiment, the platen air-blowing device 10 is a drying device that performs the air-blow drying. Therefore, the platen air-blowing device 10 that performs the "air-blow drying" is arranged upstream of the printing head 4 that is a position in which warm air can be blown to a lower side of the printing head 4 (an upper side of the platen 6).

Figure 7A:
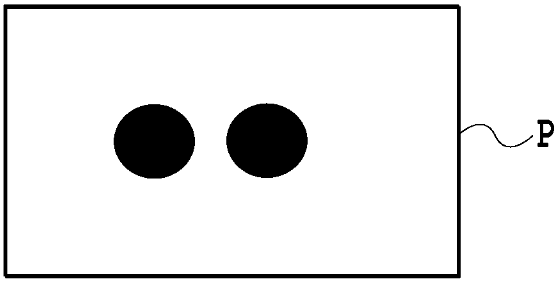
FIGS. 7A to 7E are diagrams describing uneven density that occurs due to air-blow drying.
Figure 7B:

FIGS. 7A and 7B are diagrams illustrating an ink droplet immediately after the application onto the low permeability printing medium P, and FIG. 7A is a diagram viewing the printing medium P from above. FIG. 7B is a cross-sectional view of the printing medium P illustrated in FIG. 7A. With sufficient drying by any one of the air-blowing units 10-1 to 10-4, the ink droplet applied on the printing medium P can remain in a desired place in a state of being applied without moving on the printing medium P.

Figure 7C:
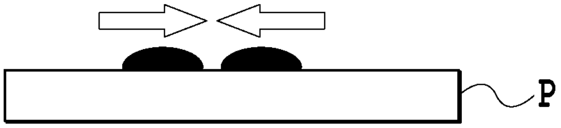
Figure 7D:
Figure 7E:
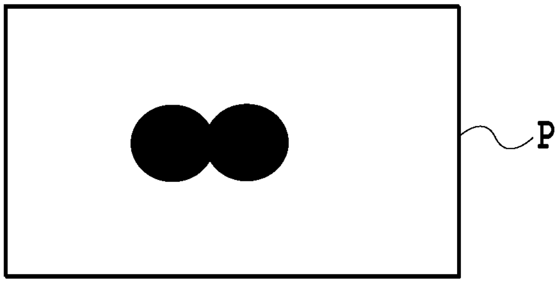

FIGS. 7C to 7E are diagrams illustrating the ink droplet applied on the printing medium P on which drying is performed by the air-blowing unit with weak drying performance out of the air-blowing units 10-1 to 10-4. FIGS. 7C and 7D are cross-sectional views of the printing medium P. With insufficient drying of the ink by the air-blowing unit, the ink droplet applied on the printing medium P cannot remain in a desired place. Therefore, as illustrated in FIG. 7C, the ink droplet is moved on the printing medium Pin a direction of an arrow in some cases. In this case, the ink droplets are put in contact with each other, and a state of a single ink droplet as illustrated in FIG. 7D is obtained. FIG. 7E is a diagram viewing the printing medium P in the state of the ink droplet in FIG. 7D from above. In FIG. 7E, comparing with FIG. 7A illustrating the printing medium P on which the ink is applied based on the image data of the same printing duty, a coverage of the ink per unit area is smaller and the density is smaller in FIG. 7E.

In a case where the platen air-blowing device 10 that performs the air-blow drying includes the multiple air-blowing units 10-1 to 10-4 as the present embodiment, in some cases, each of the multiple air-blowing units 10-1 to 10-4 has different drying performance, and a region dried sufficiently and a region dried insufficiently are mixed. In this case, even in a case where the patch with the same printing duty of less than 100% is printed, the uneven density occurs in the patch formed on the printing medium P.

Figure 8A:
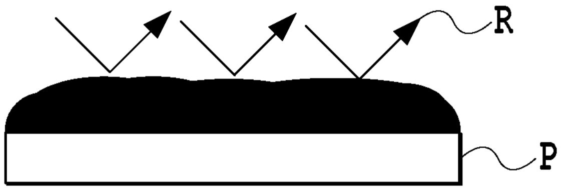
FIGS. 8A and 8B are diagrams describing the uneven density that occurs due to fixation drying.
Figure 8B:
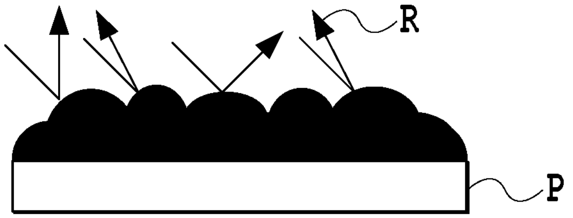

FIGS. 8A and 8B are diagrams describing the cause of the occurrence of the uneven density due to fixation drying of the image with the printing duty of 100% or greater that is formed on the low permeability printing medium. The "fixation drying" indicates drying of the ink that completes the image formation. Therefore, the fixation device 11 that performs the fixation drying is arranged in a position in which it is possible to dry the printing medium P conveyed downstream of the printing head 4.

FIGS. 8A and 8B are diagrams illustrating cross-sectional views of an ink layer formed by the fixation drying performed by any one of the fixation units 11-1 to 11-6 forming the fixation device 11 on the ink applied on the low permeability printing medium P.

FIG. 8A is a cross-sectional view of the ink layer that is formed by drying performed by the fixation unit having the performance of performing drying at a temperature proper for the fixation. In a case where the temperature of the air-blowing from the fixation unit is proper, the ink layer formed on the printing medium P has a smooth surface shape as illustrated in FIG. 8A.

FIG. 8B is a cross-sectional view of the ink layer formed by drying performed by the fixation unit having the performance of performing drying at a temperature higher than the temperature proper for the fixation. In a case where the temperature of the air-blowing from the fixation unit is high, the ink layer formed on the printing medium P obtains a surface shape having concavities and convexities as illustrated in FIG. 8B.

Arrows R in FIGS. 8A and 8B indicate regular reflected light reflected from the surface of the ink layer. In a case where the surface shape of the ink layer is smooth as illustrated in FIG. 8A, the directions of the arrows R indicating the regular reflected light are substantially one direction. On the other hand, in a case where the surface shape of the ink layer has concavities and convexities as illustrated in FIG. 8B, the directions of the arrows R indicating the regular reflected light are in various directions. Therefore, the regular reflected light is mixed with the light measured by the optical sensor 2 to obtain the density value, and the density value is determined lower than that of the smooth surface shape. Thus, in a case where printing is performed based on the image data with the printing duty of 100% or greater, the ink is applied such that the unit region on the printing medium P is entirely covered with the ink. In a case where the ink is applied such that the unit region of the printing medium P is entirely covered with the ink, the uneven density occurs due to the varied surface shape of the fixed ink layer instead of the movement of the ink droplet as described above.

In a case where the fixation device 11 is formed of the fixation units 11-1 to 11-6, in some cases, the drying performance of each of the fixation units 11-1 to 11-6 is different. In a case where the drying performance of each of the fixation units 11-1 to 11-6 is different, in some cases, the region in which the fixation is performed at the proper temperature and the region in which the fixation is performed at the temperature higher than the proper temperature are mixed. In this case, even in a case where the patch with the same printing duty of 100% or greater is printed, the uneven density still occurs in the patch formed on the printing medium P.

As described above, in order to perform the calibration properly, it is preferable in the adjustment pattern 600 formed on the printing medium P that the density is not changed by a cause other than the ejection characteristics of the ejection port array 22. However, as described above, in the printing method in which the ink ejected from the printing head 4 is dried by the drying device including the multiple drying units, variation (the uneven density) occurs within a plane of the adjustment pattern formed on the printing medium P in some cases. In this case, it is impossible to properly obtain the information related to the color printed by the ejection port array 22, and there is a possibility of reduction in the accuracy of the calibration.

For example, as for the density value in the patch of the adjustment pattern 600, the density values of different multiple positions in the patch are measured, and an average value of the measured values is obtained as the density value of the patch. Therefore, in a case where the uneven density occurs in the same patch, a proper density value of the patch cannot be obtained, and the accuracy of the calibration is reduced. Additionally, even in a case where the measured value of only one point in the patch is obtained as the density value of the patch, since the same uneven density does not occur in every calibration, the obtained density values of the patch are different depending on the timing of the calibration. In this case, a phenomenon that the color determined in the calibration cannot be reproduced after the calibration.

To deal with this, in the present embodiment, a printing region in which no air-blow drying is performed by the multiple air-blowing units of the air-blowing units 10-1 to 10-4 and no fixation drying is performed by the multiple fixation units of the fixation units 11-1 to 11-6 is set. In addition, a method of suppressing the occurrence of the uneven density in the adjustment pattern that occurs due to the difference in the drying performances between the air-blowing units 10-1 to 10-4 and the fixation units 11-1 to 11-6 by printing the adjustment pattern 600 in the set printing region.

[Flowchart]

Figure 9A:
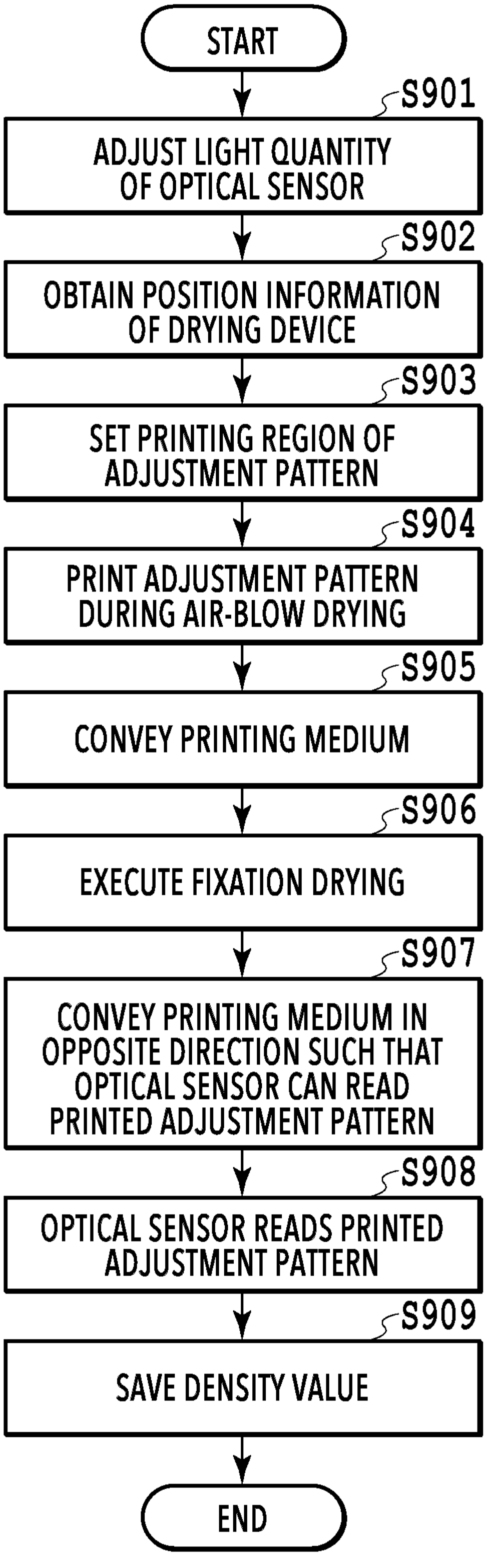
FIGS. 9A and 9B are flowcharts describing processing related to calibration.
Figure 9B:
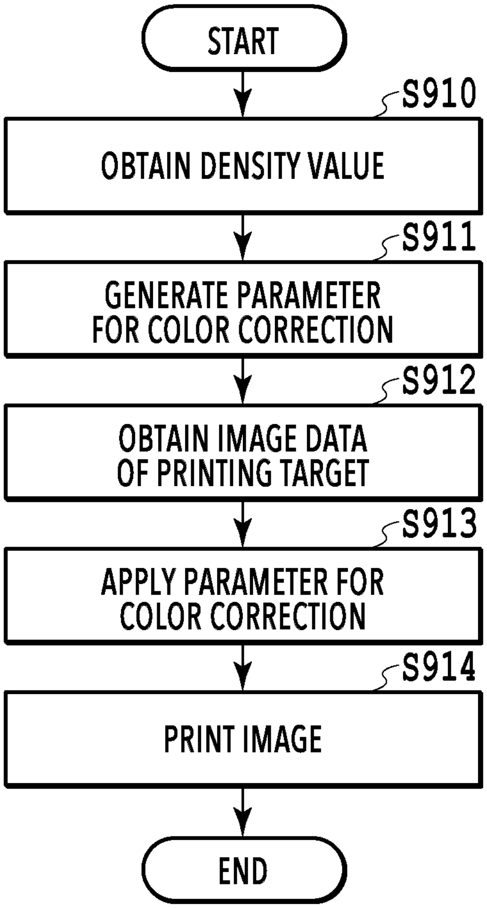

FIGS. 9A and 9B are flowcharts describing processing of performing printing based on the image data after correction by performing the calibration. A series of processing illustrated in the flowchart in FIGS. 9A and 9B is performed with the CPU 301 deploying a program code stored in the ROM 302 or the memory 313 to the RAM 303 to execute. Additionally, a part of or all the functions of the steps in FIGS. 9A and 9B may be implemented by hardware such as an ASIC and an electronic circuit. Note that, a sign "S" in the description of each processing means that it is each step in the flowchart, and the same applies to the subsequent flowchart.

The flowcharts in FIGS. 9A and 9B are flowcharts describing processing in a case where the low permeability printing medium is set in the printing apparatus 1 as the printing medium P. The flowchart in FIG. 9A starts with the user inputting an instruction via the host apparatus (PC) 312 and the CPU 301 receiving the inputted instruction.

In S901, the CPU 301 causes the light emitter 20E of the optical sensor 2 to emit the light to a paper white portion of the printing medium P, and light quantity adjustment of the light emitter 20E of the optical sensor 2 is performed by using a value obtained with the light receiver 20R receiving the reflected light.

In S902, the CPU 301 obtains position information indicating a position of each of the multiple air-blowing units 10-1 to 10-4. Additionally, the CPU 301 obtains position information indicating a position of each of the multiple fixation units 11-1 to 11-6. The position information of each drying unit of the air-blowing units 10-1 to 10-4 and the fixation units 11-1 to 11-6 may be held by a storage device such as the ROM 302 or may be inputted by the user via an input device.

In S903, the CPU 301 sets a region (the printing region) on the printing medium P on which the adjustment pattern 600 is printed based on the information of the position of each of the multiple air-blowing units 10-1 to 10-4 and the position of each of the multiple fixation units 11-1 to 11-6.

Figure 10:
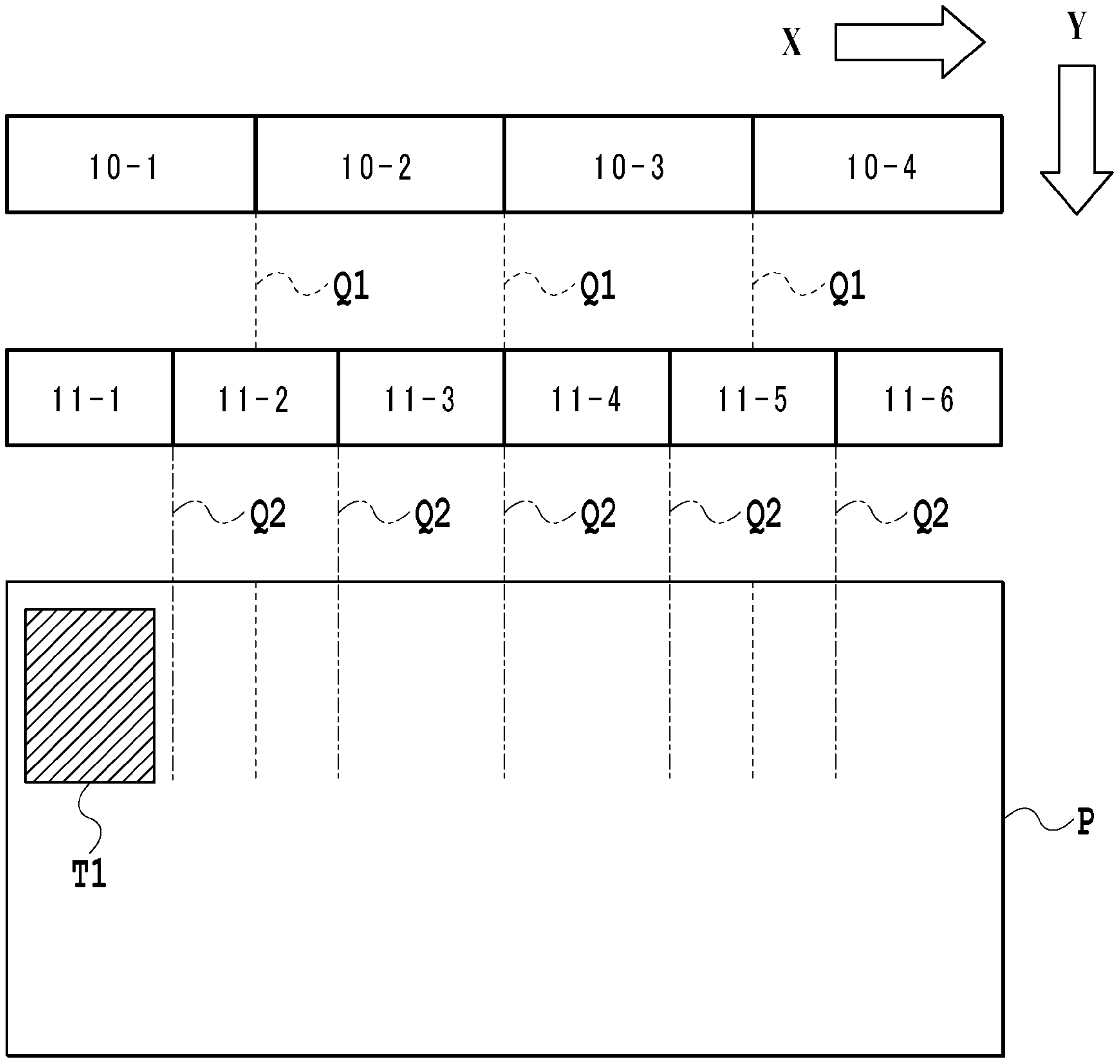
FIG. 10 is a diagram illustrating an example of a printing region of the adjustment pattern.

FIG. 10 is a conceptual view describing a method of setting the printing region of the adjustment pattern 600. In FIG. 10, the X direction is the width direction of the printing medium P that is the movement direction of the carriage 5 (the printing head 4), and the Y direction is the conveyance direction of the printing medium P.

In FIG. 10, the position and the size of each of the four air-blowing units 10-1 to 10-4 corresponding to the conveyed printing medium P are indicated by a rectangle. More specifically, the rectangle expressing each of the four air-blowing units 10-1 to 10-4 illustrated in FIG. 10 indicates the position and the size of the air outlet of the warm air of corresponding one of the air-blowing units 10-1 to 10-4.

Additionally, in FIG. 10, the position and the size of each of the six fixation units 11-1 to 11-6 corresponding to the conveyed printing medium P are indicated by a rectangle. More specifically, the rectangle expressing each of the six fixation units 11-1 to 11-6 illustrated in FIG. 10 indicates the position and the size of the air outlet of the warm air of corresponding one of the six fixation units 11-1 to 11-6.

A length of a width of the printing medium P, which is a length in the X direction, is 64 inches, for example. The four air-blowing units 10-1 to 10-4 and the fixation units 11-1 to 11-6 are arranged to correspond to the length of the width of the printing medium P.

A broken line Q1 indicates a position of an end portion of the air outlet of any one of the air-blowing units 10-1 to 10-4 in the X direction. A broken line Q2 indicates a position of an end portion of the air outlet of any one of the fixation units 11-1 to 11-6 in the X direction.

In the present embodiment, since the air-blowing units 10-1 to 10-4 and the fixation units 11-1 to 11-6 are arranged with no clearance in the X direction, for example, the end portion of the air-blowing unit 10-1 and the end portion of the air-blowing unit 10-2 are indicated by the same broken line Q1. The air-blowing units 10-1 to 10-4 may be arranged with clearances therebetween. Likewise, the fixation units 11-1 to 11-6 may be arranged with clearances therebetween.

In a case where the adjustment pattern 600 is printed in a region overlapping with the broken line Q1 on the printing medium P, that is, a region including the broken line Q1 on the printing medium P, the adjustment pattern 600 printed on the printing medium P is dried with air-blow by the multiple air-blowing units in some cases. As described above, in a case where the drying performances of the multiple air-blowing units vary, there is a possibility that the adjustment pattern 600 in which the uneven density occurs is formed. Additionally, in a case where the adjustment pattern 600 is printed in a region overlapping with the broken line Q2 on the printing medium P, the fixation drying may be performed by the multiple fixation units in some cases. In this case, as described above, there is a possibility that the adjustment pattern 600 in which the uneven density occurs is formed.

Accordingly, in S903, the CPU 301 sets the printing region of the adjustment pattern 600 in a range of a region that does not overlap with either the broken line Q1 or the broken line Q2. That is, the printing region is set within a range of a region of a single drying unit. For example, in S903, the CPU 301 sets a region T1 illustrated in FIG. 10 as the printing region. Note that, the printing region of the adjustment pattern 600 disposed in S903 is not limited to the region T1 illustrated in FIG. 10. The printing region may be any region as long as it does not overlap with either the broken line Q1 or the broken line Q2.

In S904, the CPU 301 controls each driving circuit and causes the printing head 4 to print the adjustment pattern 600 in the printing region set in S903.

For example, the CPU 301 adjusts a size of the image data of the adjustment pattern 600 according to the size of the printing region set in S903. Then, the CPU 301 generates the printing data defining ejection or non-ejection of the ink based on the image data after the size adjustment such that the printing head 4 prints the adjustment pattern 600 in the printing region on the printing medium P. The CPU 301 causes the printing head 4 to eject the ink based on the generated printing data and print the adjustment pattern 600 in the printing region on the printing medium P. In this process, printing is performed during the air-blow drying with the printing head 4 printing the adjustment pattern 600 after the air-blowing units 10-1 to 10-4 start the air-blowing.

In S905, the CPU 301 controls the driving circuit 305 to convey the printing medium P such that the fixation units 11-1 to 11-6 of the fixation device 11 can perform the fixation drying on the region in which the adjustment pattern 600 is printed on the printing medium P. S905 is performed after the printing of the adjustment pattern 600 in the printing region is completed.

In S906, the CPU 301 controls the driving circuit 308 and causes the fixation units 11-1 to 11-6 to execute the fixation drying of the region in which the adjustment pattern 600 is printed.

In S907, the CPU 301 controls the driving circuit 305 and conveys the printing medium P in the opposite direction to a position in which the optical sensor 2 can measure the adjustment pattern 600 formed on the printing medium P. In the present embodiment, the optical sensor 2 is disposed and fixed on the carriage 5. Additionally, the fixation units 11-1 to 11-6 are disposed downstream of the carriage 5 in the conveyance direction of the printing medium P. Therefore, after the fixation drying is performed, the printing medium P is conveyed in the opposite direction such that the optical sensor 2 disposed on the carriage 5 can measure the adjustment pattern 600 formed on the printing medium P.

Note that, the place in which the optical sensor 2 is disposed is not limited to the carriage 5. In a case where the optical sensor 2 is disposed in another place different from the carriage 5, the CPU 301 conveys or conveys in the opposite direction the printing medium P to the position in which the optical sensor 2 can measure the printed adjustment pattern 600.

In S908, the CPU 301 causes the optical sensor 2 to measure each patch in the adjustment pattern 600 formed on the printing medium P.

In the present step, the conveyance of the printing medium P in the Y direction and the movement of the carriage 5 on which the optical sensor 2 is attached in the X direction are alternately performed, and the optical sensor 2 measures the optical characteristics of each patch of the adjustment pattern 600 formed on the printing medium P. The CPU 301 synchronizes with a timing based on a position signal of the carriage 5 obtained by an encoder (not illustrated) and causes the optical sensor 2 to measure the optical characteristics of each patch printed on the printing medium P.

In the present embodiment, the reflection intensity (optical reflectivity) to which the density value of each patch is reflected is detected with the optical sensor 2 performing measurement by emitting the light EP to each patch forming the adjustment pattern 600 formed on the printing medium P. In a white printing medium P, the reflection intensity detected strongly, and the greater the density of the patch, the weaker the detected reflection intensity.

In S909, the CPU 301 saves the density value of each patch as a measurement result in the RAM 303 of the control unit 300, and the processing ends.

FIG. 9B is a flowchart illustrating processing of generating the parameter for color correction to correct the image data inputted for printing and printing the image.

In S910, the CPU 301 obtains the density value of each patch forming the adjustment pattern 600 that is saved as a result of the processing in the flowchart in FIG. 9A.

In S911, the CPU 301 generates the parameter for color correction to correct the inputted image data based on the density value of each patch that is obtained in S910.

In S912, the CPU 301 obtains the image data inputted for printing that is included in a printing job and the like.

In S913, the CPU 301 applies the parameter for color correction generated in S911 to the inputted image data and corrects the inputted image data. With this correction, it is possible to correct the inputted image data so as to reproduce the reference color having a color target value on the printing medium P.

In S914, the CPU 301 controls the driving circuits 305 to 308 based on the corrected image data and prints the image indicated by the inputted image data on the printing medium.

Note that, the processing in each step in the flowchart in FIGS. 9A and 9B may be performed by a control apparatus different from the printing apparatus 1 including a CPU, a ROM, and a RAM and may be performed by a processor of the host apparatus (PC) 312.

As described above, in a case where the adjustment pattern 600 is printed to overlap with the end portion of any one of the air-blowing units 10-1 to 10-4, the printed adjustment pattern 600 is dried by the multiple air-blowing units 10-1 to 10-4. The air-blowing units 10-1 to 10-4 have different drying performances in some cases, and thus the uneven density occurs in the adjustment pattern 600 in some cases by drying the adjustment pattern 600 with the multiple air-blowing units 10-1 to 10-4. Also in a case where the printed adjustment pattern 600 is dried by the multiple fixation units 11-1 to 11-6, the uneven density occurs in the image of the adjustment pattern 600 in some cases. Therefore, the printing region of the adjustment pattern 600 is set in a region that does not overlap with the region of any one of the air-blowing units 10-1 to 10-4 and a region that does not overlap with any one of the fixation units 11-1 to 11-6.

Thus, in the present embodiment, in a case where the calibration of the printing apparatus including the drying device formed of the multiple drying units is executed, the printing region in which the adjustment pattern 600 is printed is determined based on the positions of the multiple drying units. With the adjustment pattern 600 being printed in the printing region set as described above, it is possible to print the adjustment pattern 600 in the printing region while suppressing an effect of the drying performance variation of the multiple air-blowing units 10-1 to 10-4 or fixation units 11-1 to 11-6. Therefore, according to the present embodiment, it is possible to properly update the parameter for color correction as needed, and it is possible to suppress reduction in the accuracy of the calibration. Therefore, it is possible to output a stable image with no color variation.

Additionally, since the difference in the drying performances between the drying units inevitably occurs, an attempt to reduce the uneven density by the temperature adjustment of the warm air of the individual drying unit increases a burden on the user. According to the method of the present embodiment, it is possible to print the adjustment pattern on the printing medium while suppressing the effect of the individual difference between the drying units with less burden on the user.

Note that, it is described that the density value detected by the optical sensor 2 is obtained as a measured value of the adjustment pattern 600 that is obtained to generate the parameter for color correction. The measured value of the adjustment pattern 600 that is obtained to generate the parameter for color correction is not limited to the density value. In addition, for example, an apparatus capable of obtaining a color value may be used, and a mode to obtain a CMYK value, an L*a*b* value, an XYZ value, or an RGB value of each patch of the adjustment pattern 600 may be applied.

Note that, the printing apparatus 1 may be an ink jet printing apparatus that can also use a normal printing medium not having the low permeability for printing. In this case, the printing apparatus 1 may switch the method of the calibration according to the type of the conveyed printing medium. For example, the CPU 301 may switch the method of the calibration to the method described in FIGS. 9A and 9B in a case where it is determined that the low permeability printing medium is conveyed. Additionally, the CPU 301 may switch the method to the calibration to perform printing without performing either the air-blow drying or the fixation drying in a case where it is determined that the normal printing medium is conveyed. In this case, the CPU 301 may set the printing region overlapping with the broken line Q1 or the broken line Q2.

Second Embodiment

In the first embodiment, the printing apparatus 1 including the platen air-blowing device 10 formed of the air-blowing units 10-1 to 10-4 and the fixation device 11 formed of the fixation units 11-1 to 11-6 is described. In the present embodiment, a method of setting the printing region of the adjustment pattern 600 in a printing apparatus on which the platen air-blowing device 10 is mounted but the fixation device 11 is not is described. In the present embodiment, a difference from the first embodiment is mainly described. A portion not particularly stated has the same configuration and processing as that of the first embodiment. In the present embodiment, the processing of performing the fixation drying in S906 in the flowchart in FIG. 9A is skipped.

Figure 11:
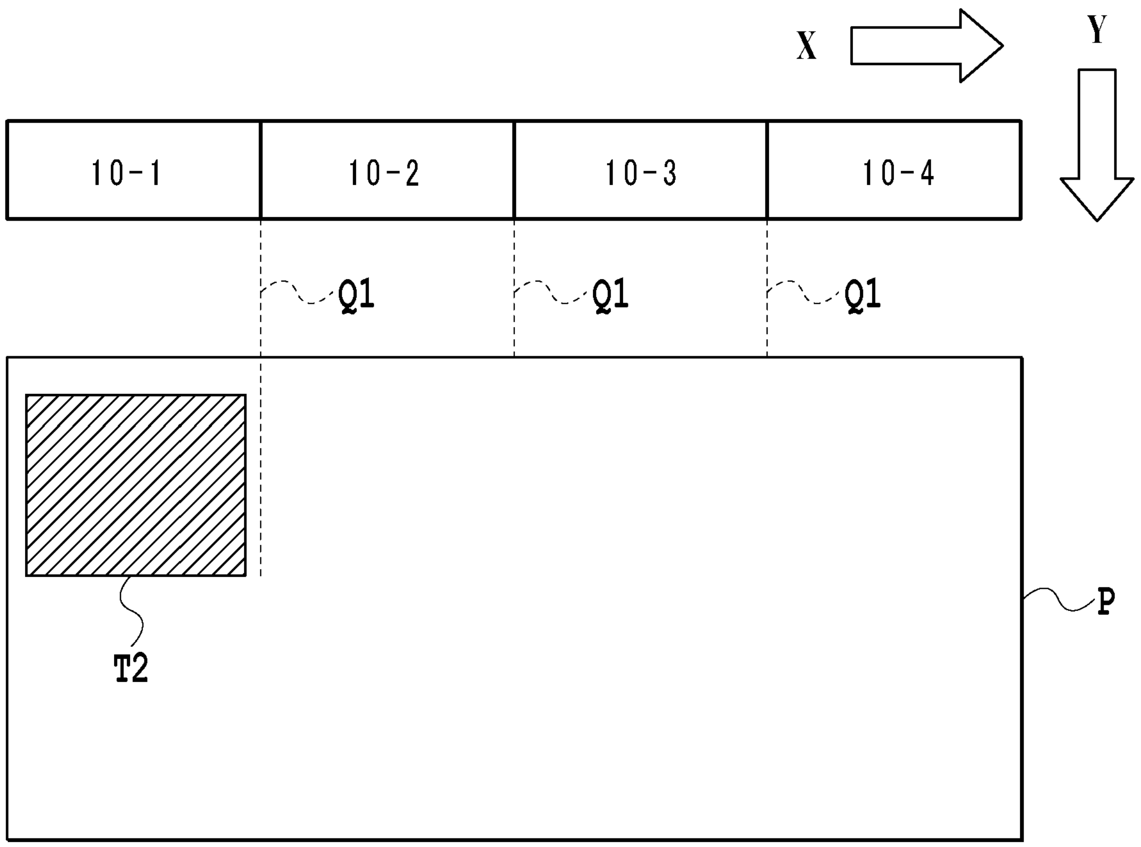
FIG. 11 is a diagram illustrating an example of the printing region of the adjustment pattern.

FIG. 11 is a diagram describing the method of setting the printing region of the adjustment pattern 600 in a second embodiment. In FIG. 11, the X direction is the movement direction of the carriage 5, and the Y direction is the conveyance direction of the printing medium. A rectangle expressing each of the four air-blowing units 10-1 to 10-4 illustrated in FIG. 11 indicates the position and the size of the air outlet of the warm air of corresponding one of the air-blowing units 10-1 to 10-4. The broken line Q1 indicates the position of the end portion of the air outlet of any one of the air-blowing units 10-1 to 10-4 in the X direction.

In the present embodiment, in S903, the CPU 301 sets the printing region of the adjustment pattern 600 in the region not overlapping with the broken line Q1. For example, in S903, the CPU 301 sets a region T2 illustrated in FIG. 11 as the printing region. Note that, the printing region of the adjustment pattern 600 is not limited to the region T2 illustrated in FIG. 11. The printing region may be any region as long as it does not overlap with the broken line Q1.

Note that, even in a case of the printing apparatus 1 on which the platen air-blowing device 10 and the fixation device 11 are mounted as the printing apparatus 1 described in the first embodiment, in some cases, the image is printed by using only the platen air-blowing device 10 depending on the ink or the printing medium used. In this case, the region T2 illustrated in FIG. 11 may also be set as the printing region to print the adjustment pattern 600 by the method of the present embodiment.

As described above, according to the present embodiment, the occurrence of the uneven density in the printed adjustment pattern 600 that occurs due to the variation in the drying performances between the multiple air-blowing units 10-1 to 10-4 is reduced. Therefore, it is possible to suppress reduction in the accuracy of the calibration.

Third Embodiment

In the present embodiment, a method of setting the printing region of the adjustment pattern 600 in a printing apparatus on which the fixation device 11 is mounted but the platen air-blowing device 10 is not is described. In the present embodiment, a difference from the first embodiment is mainly described. A portion not particularly stated has the same configuration and processing as that of the first embodiment. In the present embodiment, the processing of performing the air-blow drying in S904 in the flowchart in FIG. 9A is skipped.

Figure 12:
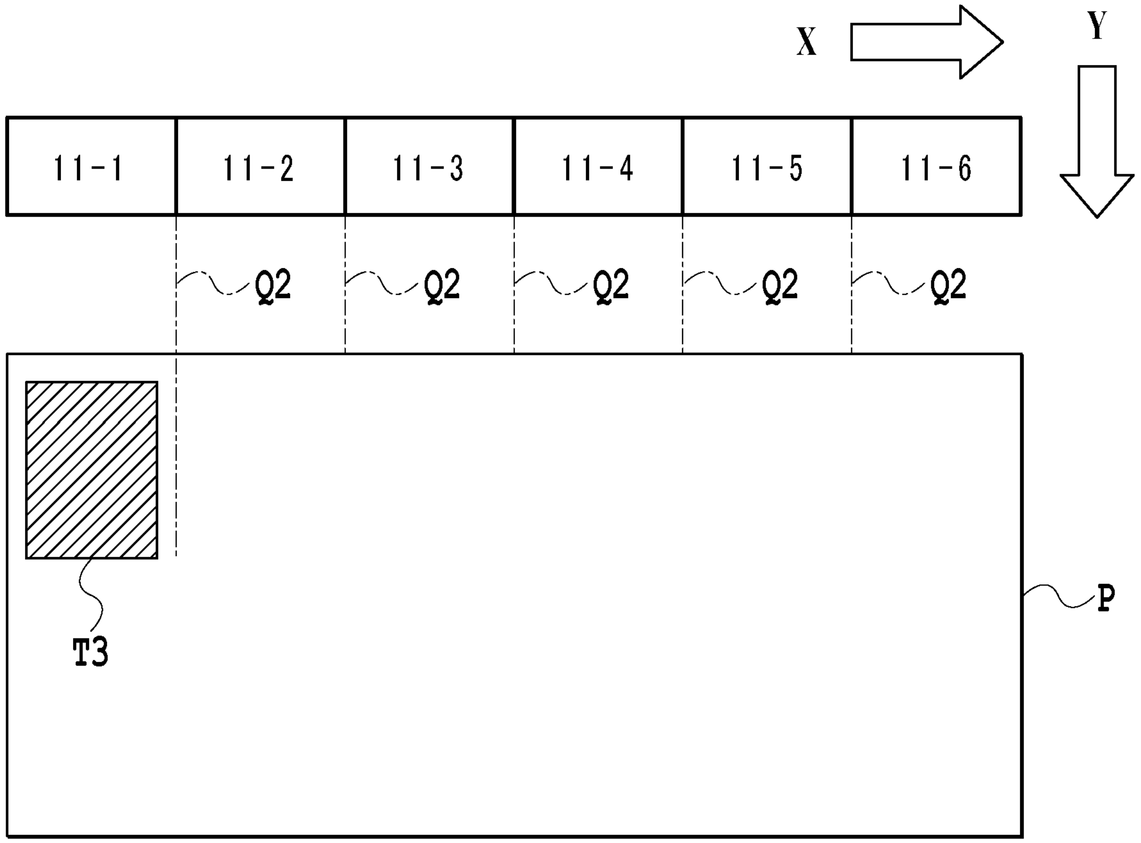
FIG. 12 is a diagram illustrating an example of the printing region of the adjustment pattern.

FIG. 12 is a diagram describing the method of setting the printing region of the adjustment pattern 600 in the present embodiment. In FIG. 12, the X direction is the movement direction of the carriage 5, and the Y direction is the conveyance direction of the printing medium. A rectangle expressing each of the six fixation units 11-1 to 11-6 forming the fixation device 11 illustrated in FIG. 12 indicates the position and the size of the air outlet of the warm air of corresponding one of the fixation units 11-1 to 11-6. The broken line Q2 indicates the position of the end portion of the air outlet of any one of the fixation units 11-1 to 11-6 in the X direction.

In the present embodiment, in S903, the CPU 301 sets the printing region of the adjustment pattern 600 in the region not overlapping with the broken line Q2. For example, in S903, the CPU 301 sets a region T3 illustrated in FIG. 12 as the printing region. Note that, the position and the size of the region T3 illustrated in FIG. 12 are an example of the printing region, and the printing region of the adjustment pattern 600 set in the present embodiment is not limited to the region T3 illustrated in FIG. 12. The printing region may be any region as long as it does not overlap with the broken line Q2.

Note that, even in a case of the printing apparatus 1 on which the platen air-blowing device 10 and the fixation device 11 are mounted as the printing apparatus 1 described in the first embodiment, in some cases, the image is printed by using only the fixation device 11 depending on the ink or the printing medium used. In this case, the region T3 illustrated in FIG. 12 may also be set as the printing region by the method of the present embodiment.

As described above, according to the present embodiment, the occurrence of the uneven density in the adjustment pattern that occurs due to the variation in the drying performances between the multiple fixation units 11-1 to 11-6 is reduced, and it is possible to suppress reduction in the accuracy of the calibration.

Fourth Embodiment

In the present embodiment, a method of setting the printing region of the adjustment pattern 600 taking into consideration the cause of the occurrence of the uneven density. The platen air-blowing device 10 and the fixation device 11 are mounted on the printing apparatus of the present embodiment as with the first embodiment, and a method of setting the printing region in a case where the adjustment pattern 600 is printed on the printing medium P by performing the air-blow drying and the fixation drying is described. In the present embodiment, a difference from the first embodiment is mainly described. A portion not particularly stated has the same configuration and processing as that of the first embodiment.

Figure 13:
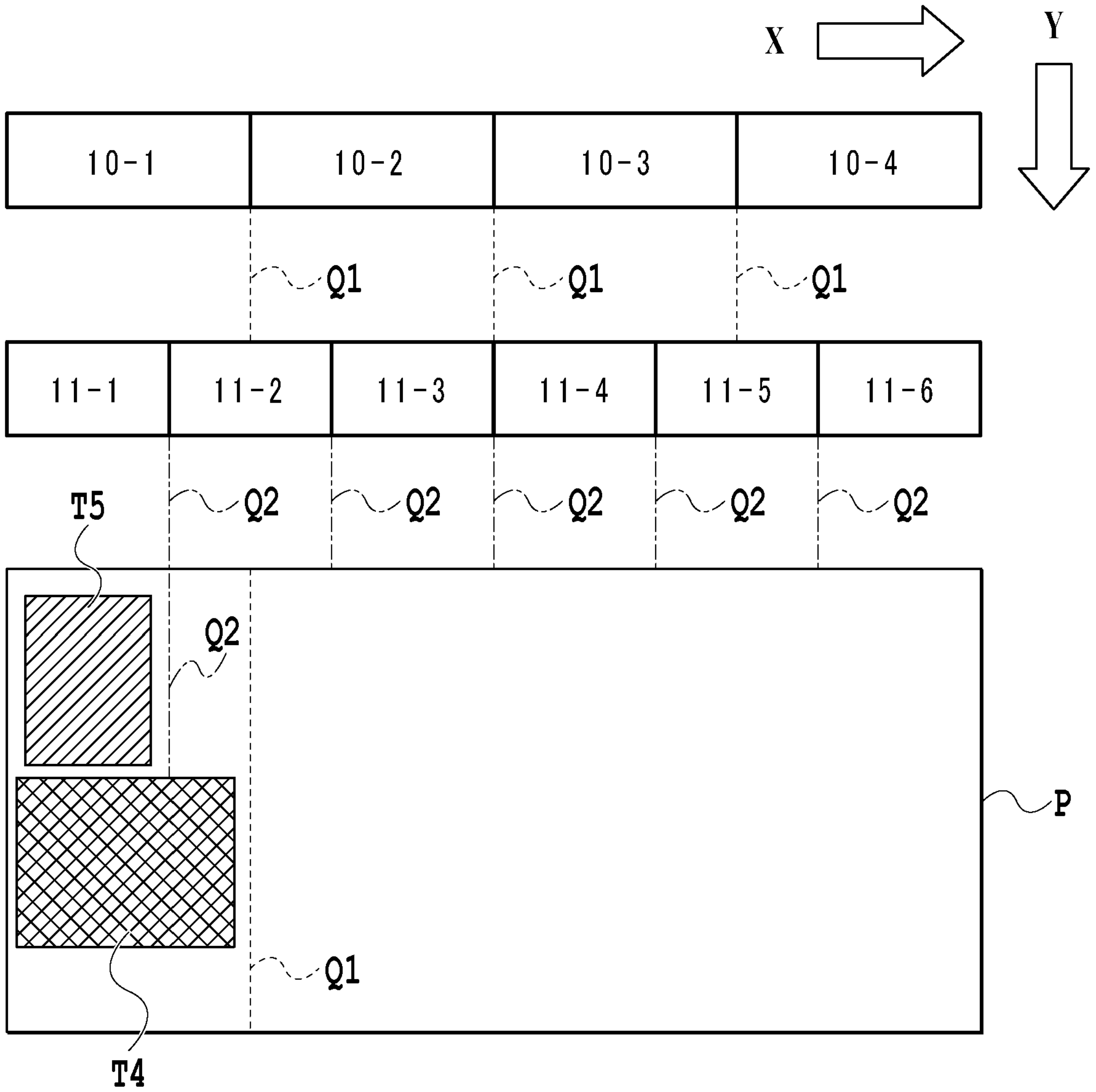
FIG. 13 is a diagram illustrating an example of the printing region of the adjustment pattern.

FIG. 13 is a conceptual view describing the method of setting the printing region of the adjustment pattern 600. In FIG. 13, the X direction is the width direction of the printing medium P, which is the movement direction of the carriage 5 (the printing head 4), and the Y direction is the conveyance direction of the printing medium P. In FIG. 13, as with FIG. 10, the position of the drying unit corresponding to the conveyed printing medium P is indicated by a rectangle. The rectangle expressing each of the four air-blowing units 10-1 to 10-4 illustrated in FIG. 13 indicates the position and the size of the air outlet of the warm air of corresponding one of the air-blowing units 10-1 to 10-4. Additionally, the rectangle expressing each of the six fixation units 11-1 to 11-6 illustrated in FIG. 13 indicates the position and the size of the air outlet of the warm air of corresponding one of the six fixation units 11-1 to 11-6. The broken line Q1 indicates the position of the end portion of the air outlet of any one of the air-blowing units 10-1 to 10-4 in the X direction. The broken line Q2 indicates the position of the end portion of the air outlet of any one of the fixation units 11-1 to 11-6 in the X direction.

In the present embodiment, a threshold is set, and out of the patches forming the adjustment pattern 600, a printing region of a patch group of the printing duty of a value less than the threshold and a printing region of a patch group of the printing duty of a value equal to or greater than the threshold are set. In the present embodiment, the threshold is 100%.

As described in the first embodiment, the uneven density that occurs in a case where the image data with the printing duty of less than 100% is printed occurs due to the variation in the drying performances between the air-blowing units 10-1 to 10-4. The patch group of the printing duty of each color that is 10% to 90% out of the patches forming the adjustment pattern 600 in FIG. 6 is a first adjustment pattern. In addition, the printing region of the first adjustment pattern is set as the region that does not overlap with the broken line Q1. For example, as illustrated in FIG. 13, a region T4 is set as the printing region of the first adjustment pattern. The printing region of the first adjustment pattern may be set as the region that overlaps with the broken line Q2.

Additionally, as described in the first embodiment, the uneven density that occurs in a case where the image data with the printing duty of 100% or greater is printed occurs due to the variation in the drying performances between the fixation units 11-1 to 11-6. The patch group of the printing duty of each color that is 100% to 160% out of the patches forming the adjustment pattern 600 in FIG. 6 is a second adjustment pattern. In addition, the printing region of the second adjustment pattern is set as the region that does not overlap with the broken line Q2 that is the end portion of any one of the fixation units 11-1 to 11-6. For example, as illustrated in FIG. 13, printing is performed in a region T5. The printing region of the first adjustment pattern may be set as the region that overlaps with the broken line Q1.

Note that, the printing region in which the adjustment pattern 600 is printed is not limited to the regions T4 and T5 illustrated in FIG. 13. The printing region of the first adjustment pattern may be any region as long as it does not overlap with the broken line Q1. The printing region of the second adjustment pattern may be any region as long as it does not overlap with the broken line Q2.

As described above, in the present embodiment, the adjustment pattern 600 is divided according to the value of the printing duty of the patch forming the adjustment pattern 600, and the printing region is set for each of the divided adjustment patterns. Therefore, it is possible to print the patch in a greater size than that of the first embodiment. Additionally, in the present embodiment, the printing regions are set as different regions for each of the divided pieces of the adjustment pattern 600. Therefore, in some cases, it is possible to set the printing region greater than the printing region set by the method in the first embodiment. Thus, in the present embodiment, it is possible to set the printing region so as to increase the size of the patch forming the adjustment pattern. Therefore, according to the present embodiment, it is possible to measure the density value of the patch more stably, and it is possible to improve the accuracy of the calibration.

Note that, in the present embodiment, the threshold is set to 100%, and the printing region is set to be divided into the first adjustment pattern, which is the patch group corresponding to the printing duty of a value less than the threshold, and the second adjustment pattern, which is the patch group corresponding to the printing duty of a value equal to or greater than the threshold. The reason of setting the threshold to 100% is because the cause of the occurrence of the uneven density is changed depending on whether the printing duty is 100% or greater in a case where printing one dot at 1200 dpi is 100%. The value of the printing duty that changes the cause of the occurrence of the uneven density is not limited to 100% and is changed depending on the printing medium and the ink used. Therefore, the threshold may be changed according to the value of the printing duty that changes the cause of the occurrence of the uneven density.

Other Embodiments

The region T1 to the region T5 described in the above-described embodiments are described to be each set in one place; however, the region T1 to region T5 may be disposed in multiple places. For example, in the first embodiment, multiple printing regions that do not overlap with both the broken line Q1 and broken line Q2 may be set as the printing region, the adjustment pattern 600 may be printed in each of the multiple printing regions, and the parameter for color correction may be generated by averaging the measured density values.

According to the present disclosure, it is possible to suppress reduction in the accuracy of the calibration in a printing apparatus that prints an image with multiple drying units performing drying.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-209241 filed Dec. 12, 2023, which is hereby incorporated by reference herein in its entirety.

What is claimed is:

1. A control apparatus configured to control a printing apparatus, the printing apparatus including: (1) a conveyance mechanism configured to convey a printing medium along a first direction; (2) a printing head configured to eject a liquid onto the conveyed printing medium; and (3) a plurality of dryers arranged in a second direction crossing the first direction and configured to dry the liquid ejected on the printing medium, the control apparatus comprising:

(A) one or more processors and at least one memory, the at least one memory being coupled to the one or more processors and having stored therein instructions executable by the one or more processors, and/or (B) one or more circuits, wherein the one or more circuits and/or the execution of the instructions causes the control apparatus to function as a plurality of units comprising:

(1) a setting unit configured to (a) obtain information of a position of an end portion of each of the plurality of dryers in the second direction and (b) set a region on the printing medium so as not to overlap with the position of the end portion on the printing medium based on the information; and (2) a control unit configured to cause the printing head to print an adjustment pattern for calibration in the region set on the printing medium.

2. The control apparatus according to claim 1, wherein the printing apparatus further includes a sensor configured to measure the region on the printing medium on which the liquid is ejected by the print head, and wherein the one or more circuits and/or the execution of the instructions causes the control apparatus to further function as an execution unit configured to execute calibration based on a result of measuring, by the sensor, of the adjustment pattern printed by the printing head.

3. The control apparatus according to claim 2, wherein the one or more circuits and/or the execution of the instructions causes the control apparatus to further function as a switching unit configured to switch a method of the calibration depending on a type of the printing medium conveyed by the conveyance mechanism, wherein in a case where the printing medium conveyed by the conveyance mechanism is a low permeability printing medium, the switching unit causes the setting unit to set the region based on the information of the position.

4. The control apparatus according to claim 1, wherein the plurality of dryers includes (1) a plurality of first dryers and (2) a plurality of second dryers, and wherein the setting unit obtains information of a position of an end portion of each of the plurality of first dryers in the second direction and information of a position of an end portion of each of the plurality of second dryers in the second direction and sets the region so as not to overlap with any of the obtained positions of the end portions.

5. The control apparatus according to claim 4, wherein the plurality of first dryers are dryers configured to perform air-blow drying, and wherein the plurality of second dryers are dryers configured to perform fixation drying.

6. The control apparatus according to claim 1, wherein the adjustment pattern includes a plurality of patches corresponding to a value of printing duty, and wherein the setting unit sets, as the region, (1) a first region to print a patch, among the plurality of patches, that corresponds to a printing duty smaller than a threshold and (2) a second region to print a patch, among the plurality of patches, that corresponds to a value of a printing duty equal to or greater than the threshold.

7. The control apparatus according to claim 6, wherein the setting unit obtains information of a first position that is the position of the end portion of each of the plurality of first dryers in the second direction and sets the first region so as not to overlap with the first position on the printing medium.

8. The control apparatus according to claim 6, wherein the setting unit obtains information of a second position that is the position of the end portion of each of the plurality of second dryers in the second direction and sets the second region so as not to overlap with the second position on the printing medium.

9. The control apparatus according to claim 1, wherein the plurality of dryers are dryers configured to perform air-blow drying on the liquid ejected on the printing medium.

10. The control apparatus according to claim 1, wherein the plurality of dryers are units configured to perform fixation drying on the liquid ejected on the printing medium.

11. The control apparatus according to claim 1, wherein the setting unit sets a plurality of the regions.

12. The control apparatus according to claim 1, wherein the printing head is configured to eject a plurality of types of liquids.

13. The control apparatus according to claim 1, wherein each of the plurality of dryers includes a fan, a heater, and an air outlet and is configured to blow warm air from the air outlet, and wherein an end portion of the dryer in the second direction is an end portion of the air outlet in the second direction.

14. A printing apparatus comprising:

a conveyance mechanism configured to convey a printing medium along a first direction;

a printing head configured to eject a liquid onto the conveyed printing medium;

a plurality of dryers arranged in a second direction crossing the first direction and configured to dry the liquid ejected on the printing medium; and (A) one or more processors and at least one memory, the at least one memory being coupled to the one or more processors and having stored therein instructions executable by the one or more processors, and/or (B) one or more circuits, wherein the one or more circuits and/or the execution of the instructions causes the printing apparatus to function as a plurality of units comprising:

(1) a setting unit configured to (a) obtain information of a position of an end portion of each of the plurality of dryers in the second direction and (b) set a region on the printing medium so s not to overlap with the position of the end portion on the printing medium based on the information; and (2) a control unit configured to cause the printing head to print an adjustment pattern for calibration in the region set on the printing medium.

15. A control method of a printing apparatus, the printing apparatus comprising: (1) a conveyance mechanism configured to convey a printing medium along a first direction; (2) a printing head configured to eject a liquid onto the conveyed printing medium; and (3) a plurality of dryers arranged in a second direction crossing the first direction and configured to dry the liquid ejected on the printing medium, the control method comprising:

obtaining information of a position of an end portion of each of the plurality of dryers in the second direction;

setting a region on the printing medium so as not to overlap with the position of the end portion on the printing medium based on the information; and causing the printing head to print an adjustment pattern for calibration in the region set on the printing medium.

16. A non-transitory computer-readable storage medium storing a program which causes a computer to perform a control method of a printing apparatus, the printing apparatus comprising: (1) a conveyance mechanism configured to convey a printing medium along a first direction; (2) a printing head configured to eject a liquid onto the conveyed printing medium; and (3) a plurality of dryers arranged in a second direction crossing the first direction and configured to dry the liquid ejected on the printing medium, the control method comprising:

obtaining information of a position of an end portion of each of the plurality of dryers in the second direction;

setting a region on the printing medium so as not to overlap with the position of the end portion on the printing medium based on the information; and causing the printing head to print an adjustment pattern for calibration in the region set on the printing medium.

* * * * *